Jan. 30, 1951   D. J. DESCHAMPS   2,539,571
HYDRAULIC APPARATUS
Filed Oct. 23, 1942   11 Sheets-Sheet 1
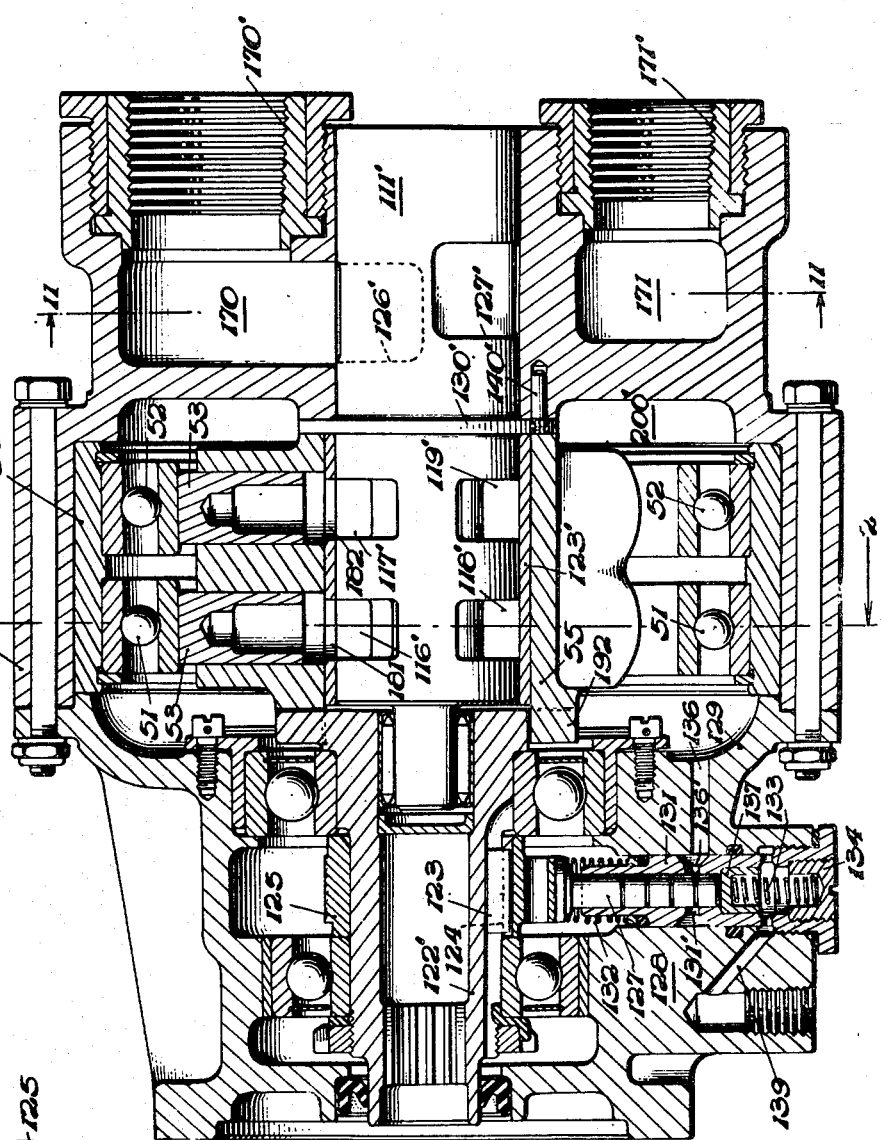
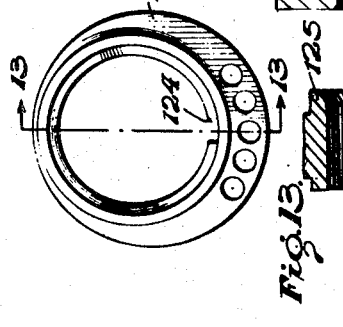
Inventor
*Desire J. Deschamps*
By *Martin J. Finnegan*
Attorney Jan. 30, 1951     D. J. DESCHAMPS     2,539,571
HYDRAULIC APPARATUS
Filed Oct. 23, 1942     11 Sheets—Sheet 2
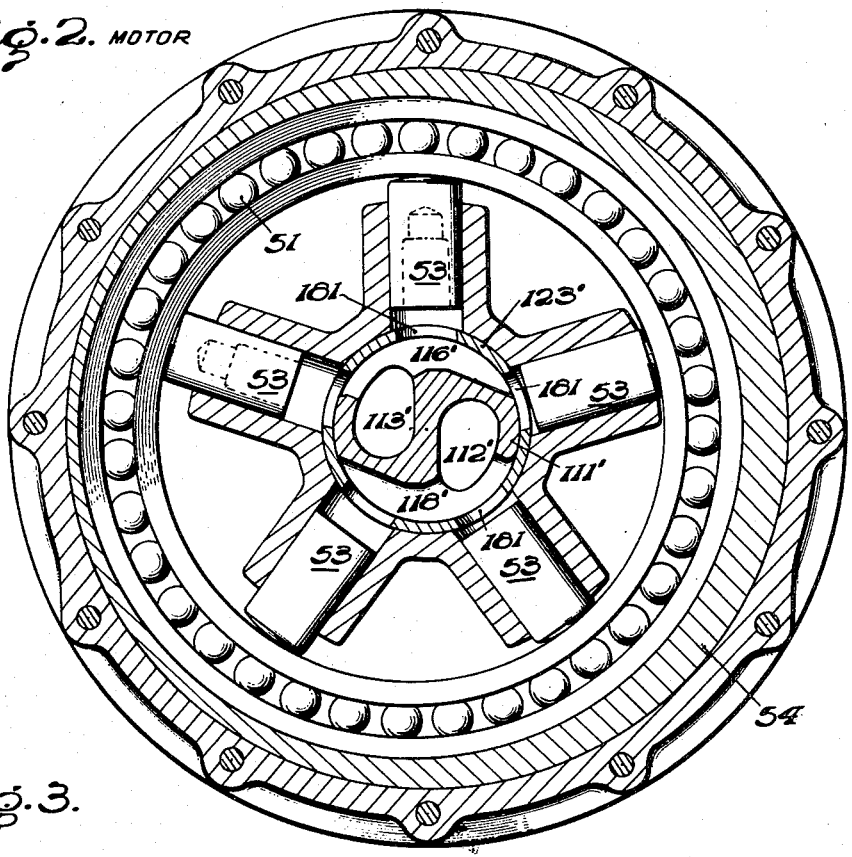
Fig. 2. MOTOR
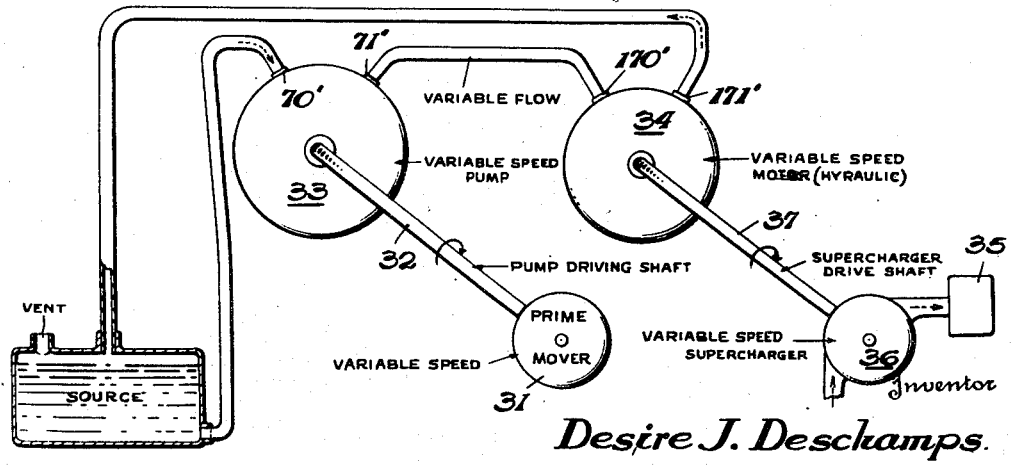
Fig. 3.
Inventor
Desire J. Deschamps.
By Martin J. Finnegan
Attorney Inventor
Desire J. Deschamps.
By Martin J. Finnegan
Attorney

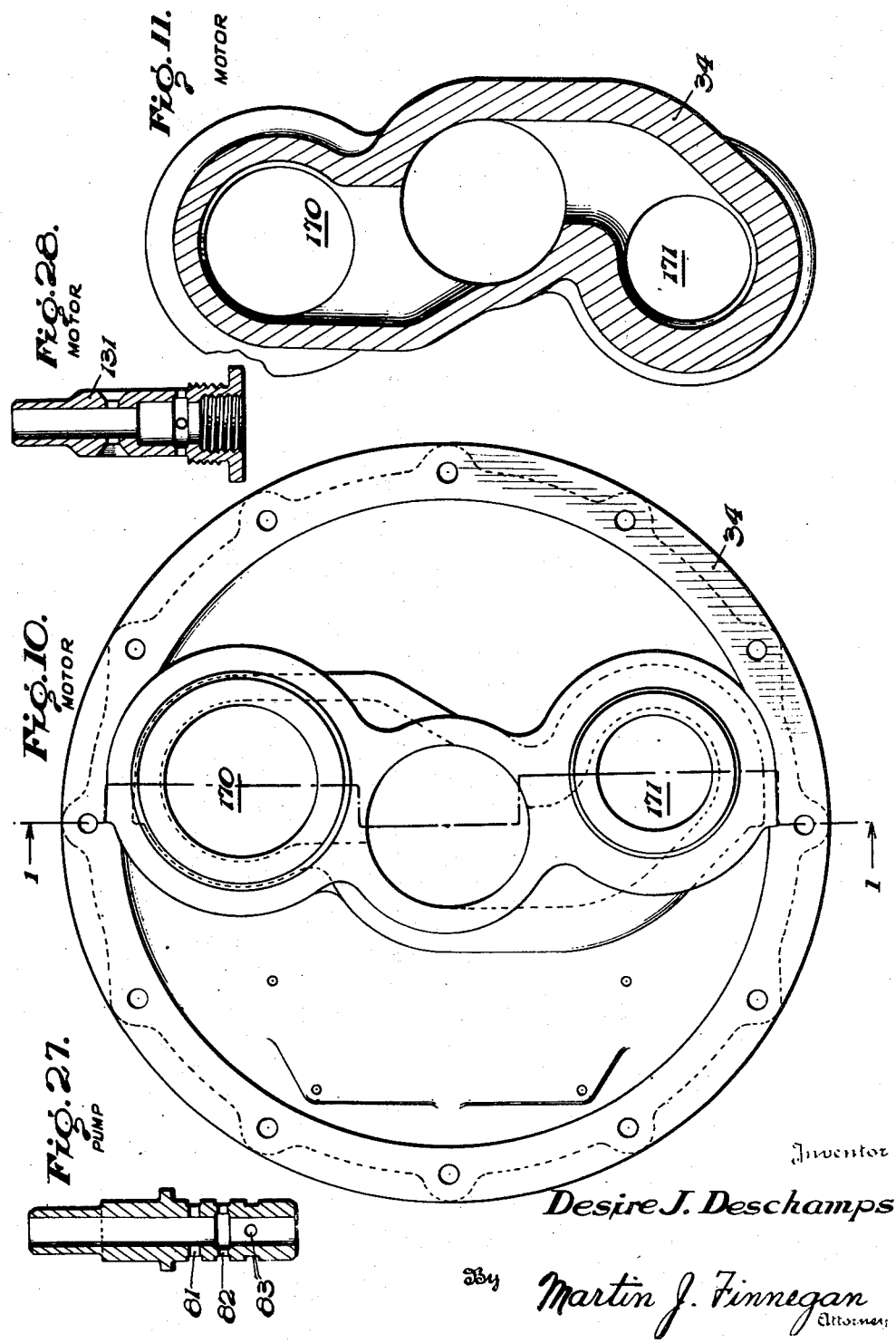

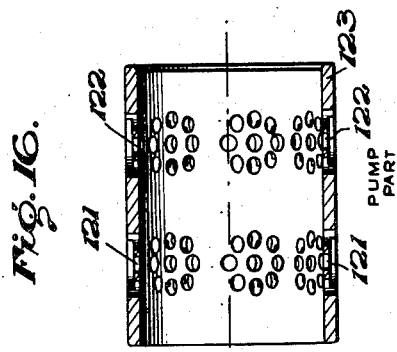
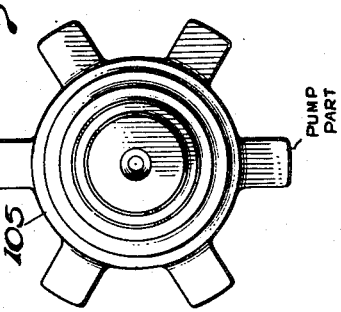
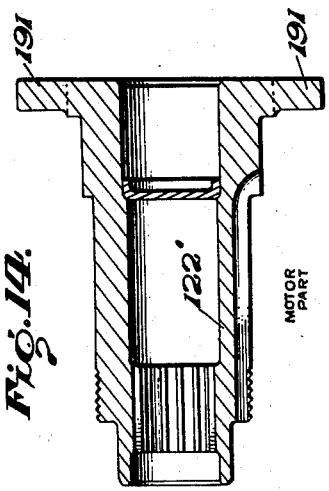
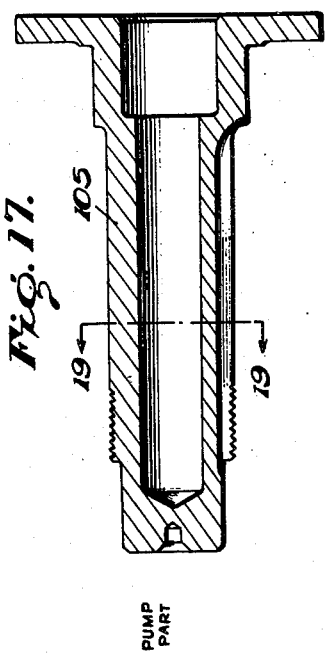
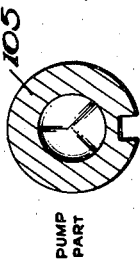
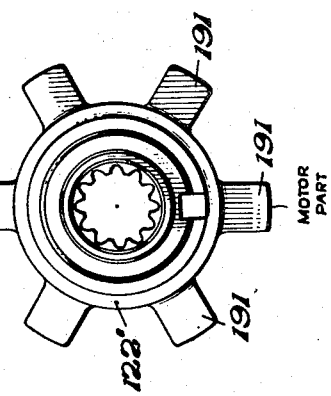

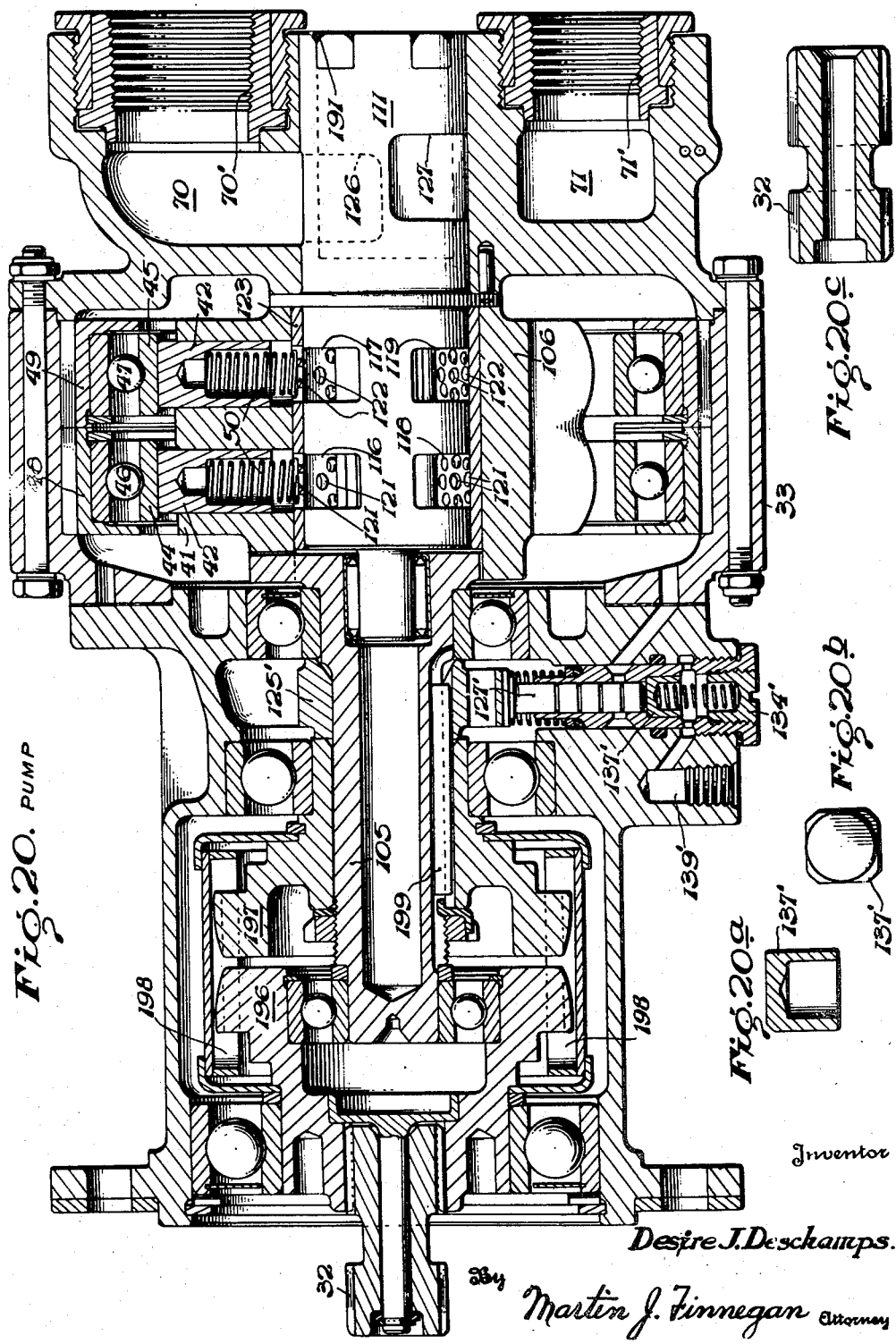

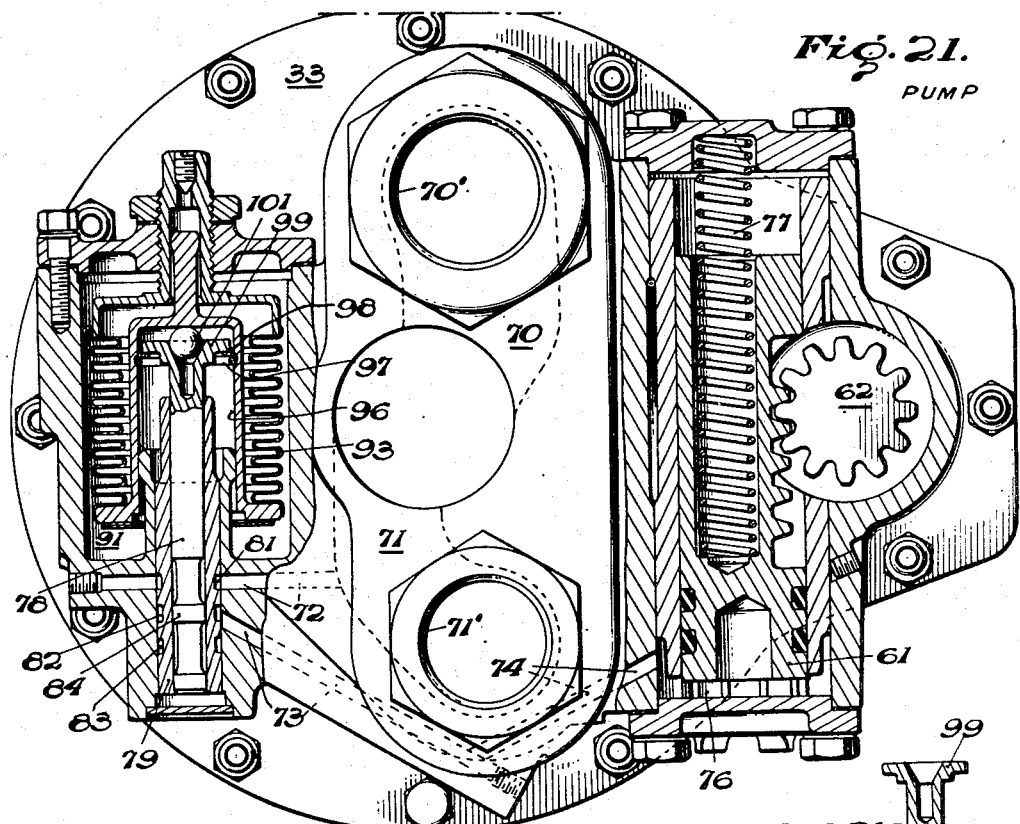
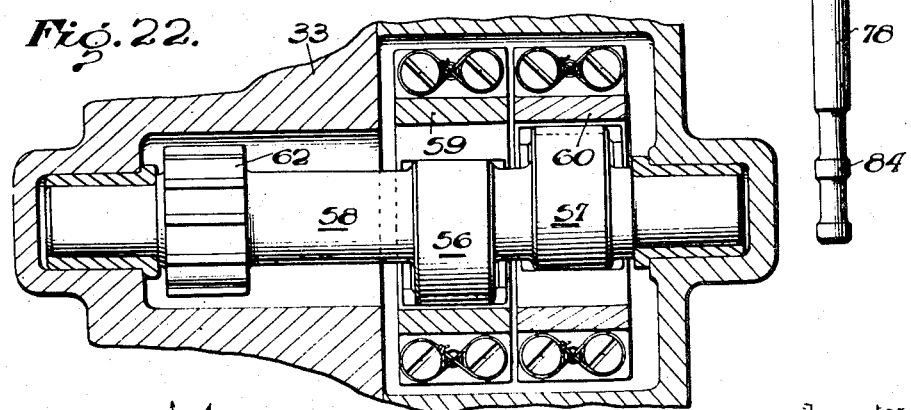
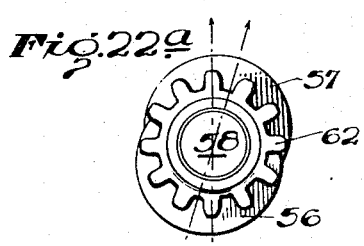

Jan. 30, 1951  D. J. DESCHAMPS  2,539,571
HYDRAULIC APPARATUS
Filed Oct. 23, 1942  11 Sheets-Sheet 8

PUMP

Desire J. Deschamps.
By Martin J. Finnegan
Attorney

Jan. 30, 1951  D. J. DESCHAMPS  2,539,571
HYDRAULIC APPARATUS
Filed Oct. 23, 1942  11 Sheets-Sheet 9
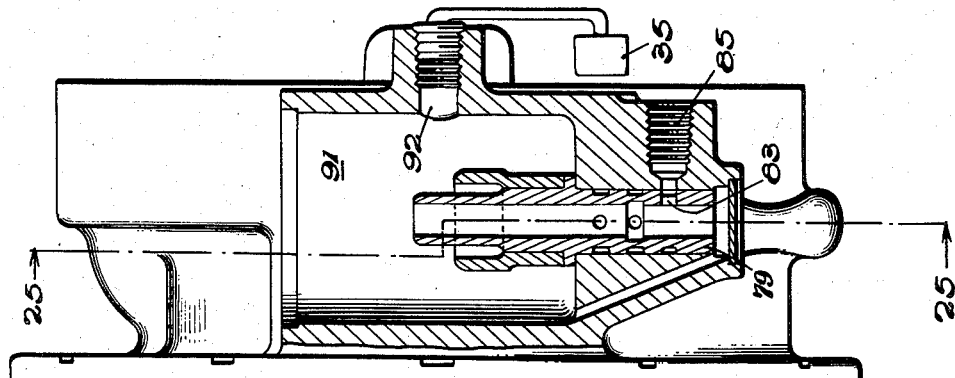
Fig. 26.
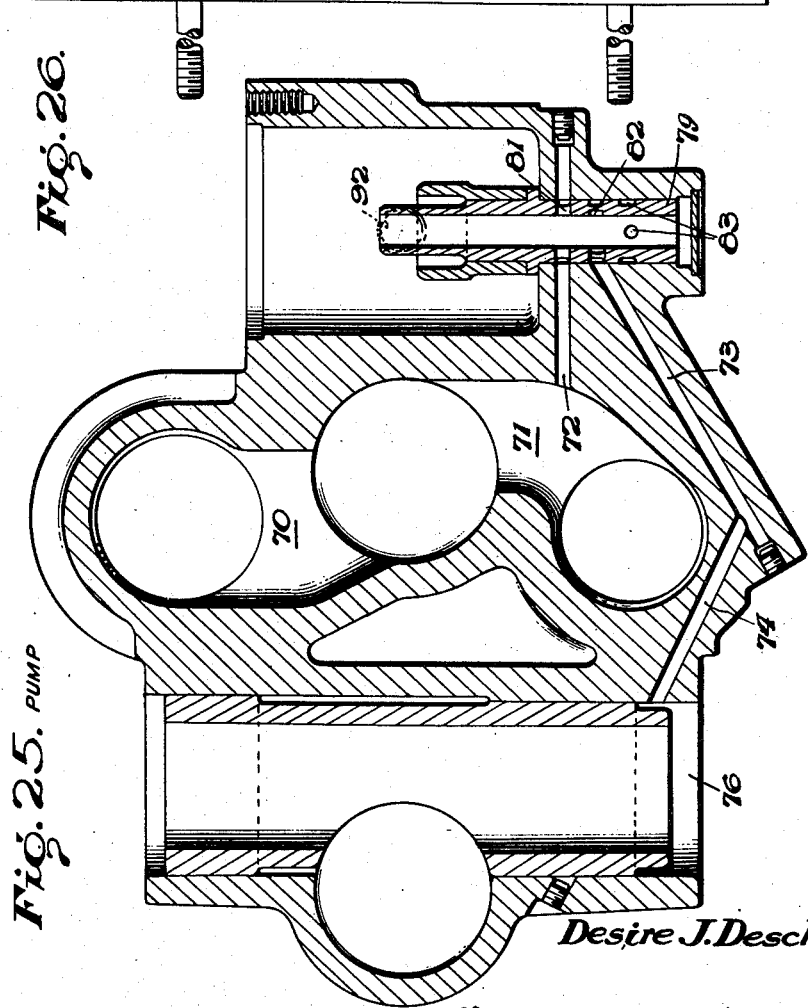
Fig. 25. PUMP
Inventor
Desire J. Deschamps.
By Martin J. Finnegan
Attorney

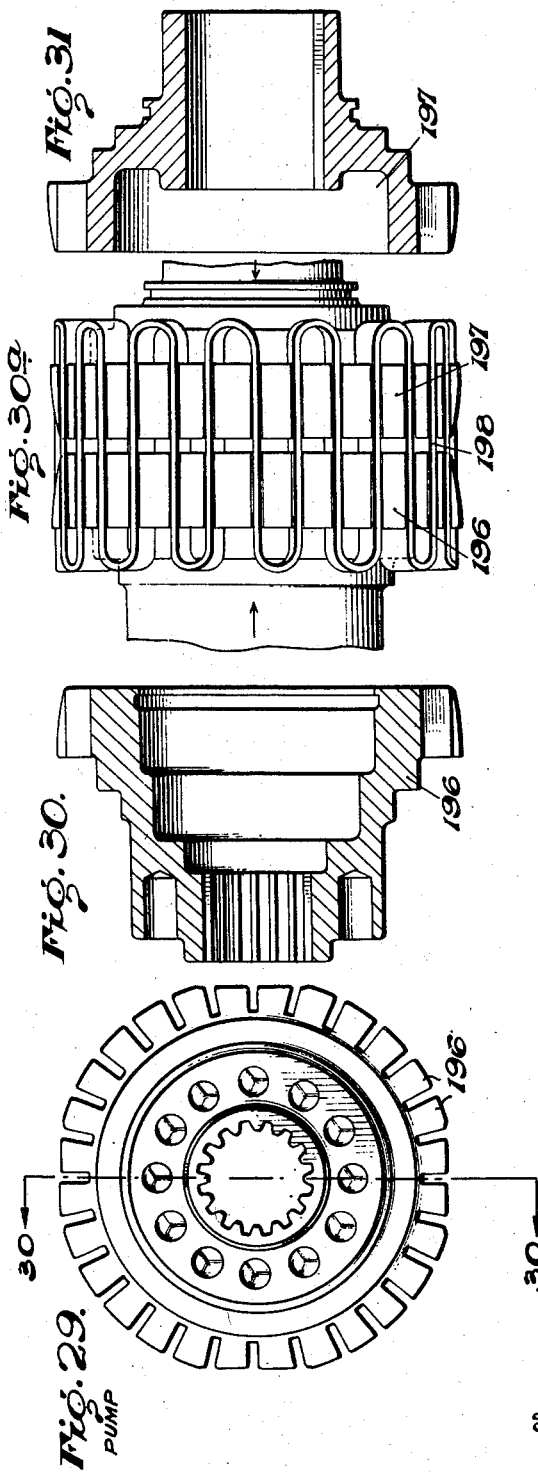

Jan. 30, 1951  D. J. DESCHAMPS  2,539,571
HYDRAULIC APPARATUS
Filed Oct. 23, 1942  11 Sheets-Sheet 11
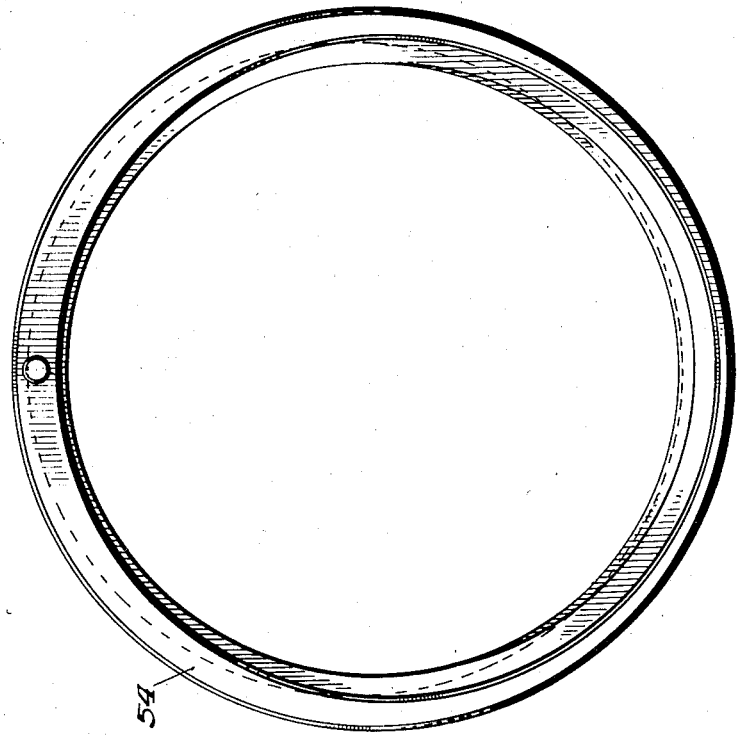
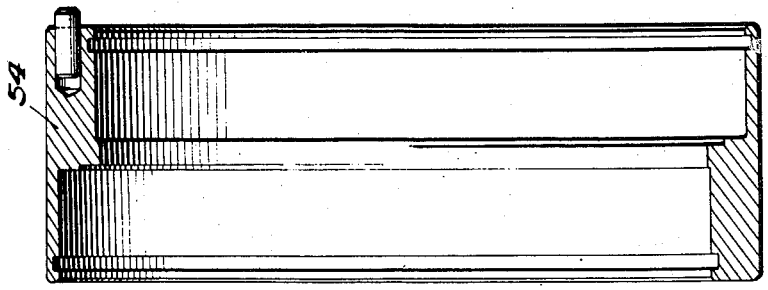
Inventor
*Desire J. Deschamps.*
By *Martin J. Finnegan*
Attorney Patented Jan. 30, 1951

2,539,571

UNITED STATES PATENT OFFICE 2,539,571

HYDRAULIC APPARATUS

Desire J. Deschamps, Rutherford, N. J., assignor to Bendix Aviation Corporation, South Bend, Ind., a corporation of Delaware Application October 23, 1942, Serial No. 463,129

3 Claims. (Cl. 103—161)

This invention relates to hydraulic systems, and particularly to a hydraulic system of energy conversion.

An object is to provide a novel method of taking energy from a variable speed prime mover and delivering such energy to another unit at a point remote from the prime mover.

Another object is to provide a novel system of the character indicated. Such a system, although it will have other uses, is particularly desirable for operation of a supercharger to supply breathable air to the occupants of a closed aircraft compartment ("cabin"), as the system provides assurance that the speed of the supercharger drive will automatically be adjusted as frequently as is necessary to maintain the cabin air supply at whatever rate of replenishment is necessary for the breathing requirements of the occupants.

Another object is to provide a hydraulic pump of novel construction, which novel construction renders said pump desirable for use in a system of the character indicated, as well as in other applications.

A further object is to provide a hydraulic motor of novel construction, which novel construction renders said motor desirable for use in a system of the character indicated, as well as in other applications.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Fig. 1 is a central sectional view on line 1—1 of Figure 10 of a hydraulic motor embodying one phase of the invention and constituting one unit of the complete system shown diagrammatically in Fig. 3;

Fig. 2 is a transverse view of the motor taken on line 2—2 of Fig. 1;

Fig. 3 is a schematic diagram of the complete system embodying the invention;

Figure 4:
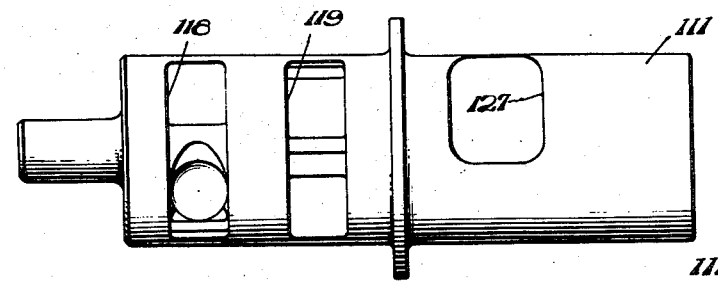
Figure 5:
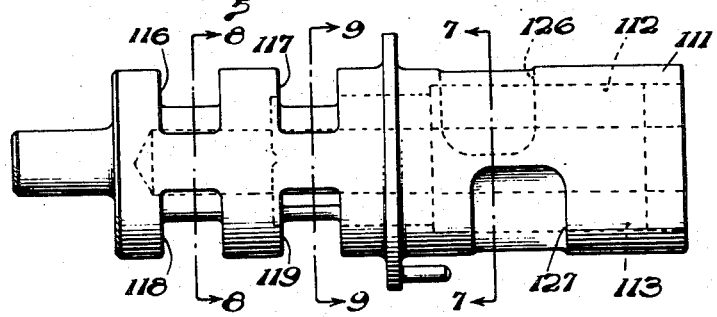
Figure 6:
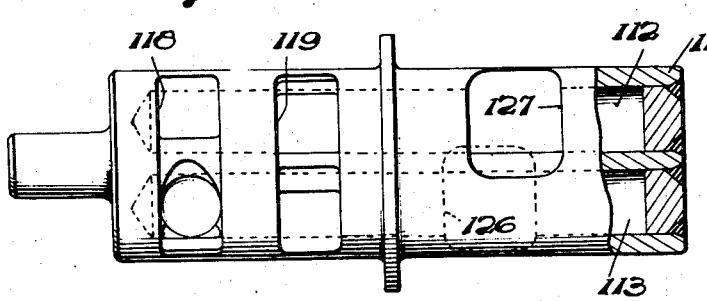
Figure 7:
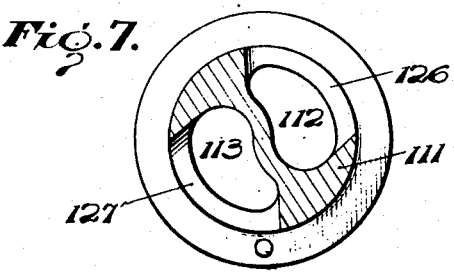
Figure 8:
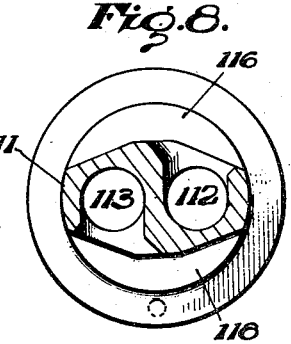
Figure 9:
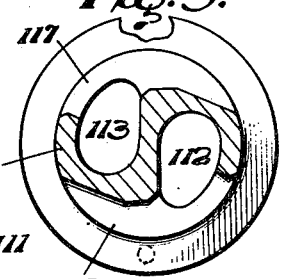

Figs. 4 to 9, inclusive, are views of the pintle common to both motor and pump, and showing the arrangement of fluid flow directing ports and passages, Figures 7, 8 and 9 being taken on lines 7—7, 8—8, and 9—9, respectively, of Figure 5.

Figure 23:
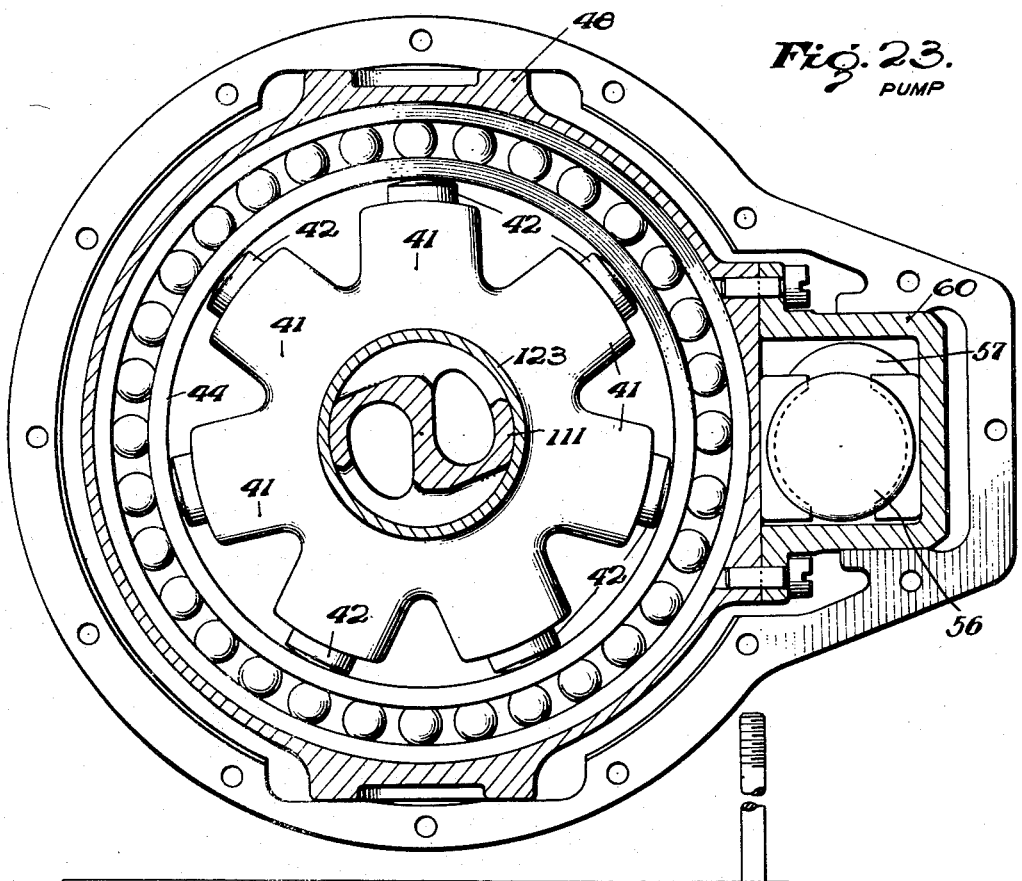
Figure 24:
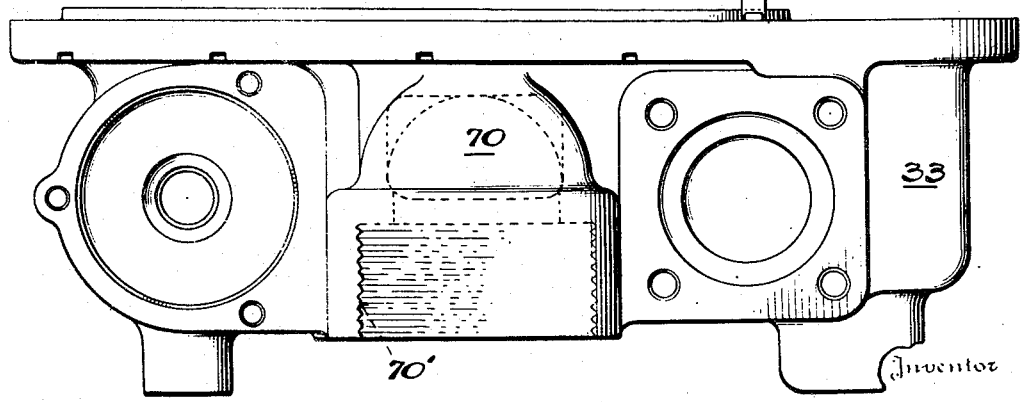

Fig. 10 is an end view of the motor of Fig. 1;

Fig. 11 is a view along line 11—11 of Fig. 1;

Fig. 12 is a view of the eccentric ring;

Fig. 13 is a view along line 13—13 of Fig. 12;

Figs. 14 to 19, inclusive, are views of component parts, Figure 19 being taken on line 19—19 of Figure 17;

Fig. 20 is a longitudinal sectional view of the pump;

Fig. 21 is a transverse view of the pump;

Fig. 22 is another sectional view of a part of the pump;

Figs. 20a, 20b, 20c, 21a, 22a, 27, 28, 29, 30, 30a, 31 and 32 to 37, inclusive, are views of component parts the sections for Figures 30 and 35 being taken on line 30—30 of Figure 29 and 35—35 of Figure 32, respectively;

Fig. 23 is a transverse view of the pump;

Fig. 24 is another view of the parts shown in Fig. 21; and

Figs. 25 and 26 are sectional views of the housing surrounding the parts shown in Fig. 21, the section for Figure 25 being taken on line 25—25 of Figure 26.

Referring first to Fig. 3, there is shown diagrammatically at 31 a variable speed prime mover which may be an internal combustion engine from which power may be taken by any suitable power take-off, a diagrammatic illustration of which is shown at 32 in the form of a shaft adapted to drive a variable speed, high pressure pump 33, shown in detail in Figs. 20 to 27, inclusive, and 29 to 35, inclusive. At 34 is shown a variable speed hydraulic motor such as the motor that is shown in detail in Figs. 1, 2 and 4 to 16, inclusive, although the details shown in Figs. 4 to 9, inclusive, are common to both the pump unit 33 and the motor unit 34, and at 36 is shown a unit such as an aircraft cabin supercharger adapted to be driven at variable speed by the motor 34 through the agency of mechanical connections of which a diagrammatic illustration is shown at 37.

The pump comprises a plurality of cylinders 41 having pistons 42 which operate in a plane at right angles to the rotation of the cylinders; that is, the pistons are arranged in a radially extending position (see Fig. 23) to cooperate with one or the other of two enclosing rings 44 and 45, the former being the enclosing means for the left-hand bank of pistons 42 (see Fig. 20) and the ring 45 being the enclosing means for the right-hand bank of pistons 42, and each ring being the inner race of a ball bearing assembly; the ball bearing assembly 46 being in turn enclosed by (and shiftable with) a slide-block 48, while the ball bearing assembly 47 is similarly enclosed by and shiftable with a slide-block 49; the two slide-blocks being shifted by oppositely directed eccentrics, so that they move oppositely with respect to the axis of the cylinder block, whereby oppositely disposed pistons are coupled for simultaneous suction and discharge of fluid during each cycle of rotation. The motor construction (Fig. 1) is the same, except that the location of the ball bearing assemblies 51 and 52 is fixed, and therefore the eccentricity (hence the piston displacement) remains constant; the fixed two-way eccentric ring which determines the opposing eccentricities and therefore governs the displacement of the motor pistons 53, being shown best at 54 in Fig. 2, although also shown in Fig. 1, Fig. 36 and Fig. 37.

While it is known to employ a single shiftable ring to control the displacement of a rotating, radial cylinder type of pump, the use of two oppositely shifting rings and the specific shifting means disclosed herein are believed to be novel. Such shifting means, as shown best in Figs. 21 and 22, includes a pair of eccentric portions 56 and 57 spaced axially on a shaft 58 to engage and actuate a pair of correspondingly spaced yokes 59 and 60 forming part of shiftable slide-blocks 49 and 48, respectively; the said slide-blocks 49 and 48 being the displacement controlling means for the two banks of pistons 42. It will be noted that eccentric 56 has its center offset 180 degrees from the center of eccentric 57, although each eccentric center is equally distant from the axis of rotation of the shaft 58 on which said eccentric portions are formed. The shaft 58 is adapted to be rotated by a rack-toothed plunger 61 whose teeth mesh with those of pinion 62, the latter being integral with shaft 58. Plunger 61 is in turn actuated by fluid pressure changes occurring in outlet chamber 71 (Fig. 21) of the pump; said pressure changes being communicated to the plunger 61 by way of communicating passages 72, 73 and 74 (Figs. 21 and 25) leading to plunger chamber 76, and acting (in conjunction with opposing spring 77) to control the position of plunger 61. A sleeve-and-plunger type of valve 78, 79 governs the direction of flow in passages 73 and 74; the valve 79 being provided with inlet and discharge ports 81 and 83, respectively, on opposite sides of the central port 82, which central port is closed by valve head 84 (see Fig. 21a) when the valve plunger 78 is in neutral position. The plunger 78 is shown as subject to movement by changes in the air pressure within the cabin 35 (see Fig. 3) or other sealed compartment of an aircraft; valve movement being downward when internal cabin pressure is lower than desired, and upward when internal cabin pressure is higher than desired; the cabin air pressure being communicated to bellows chamber 91 by way of a pipe leading from cabin 35 to pipe terminal 92 (Fig. 26) so that said pressure acts upon bellows 93 to tend to compress said bellows and thus lift valve 78, through the interposed connecting members 96, 97 and 98 (Fig. 21); the latter being in engagement with valve head 99. Lowered pressure in the cabin (and hence in chamber 91) permits bellows 93 to expand, thus pressing valve 78 downwardly, through the action of member 96 upon ball 101 and valve head 99. In the down position fluid is fed into plunger chamber 76 to raise plunger 61 and thus rotate eccentrics 56 and 57 in a direction to increase the eccentricity of stroke-controlling rings 44 and 45, thus increasing the amount of fluid pumped per revolution of the drive-shaft 105 (Fig. 20). This increased output causes motor 34 to accelerate, and with it the supercharger 36 (Fig. 3). Thus more supercharged air is made available for delivery into the cabin 35 (Fig. 3). Eventually—the cabin pressure having been boosted sufficiently—bellows 93 will be compressed sufficiently to raise valve 78 to the fluid-dumping position; that is, ports 82 and 83 will be connected to allow the fluid that has been trapped in passages 73 and 74 to escape through discharge port 83, leading to the atmosphere by way of vent 85 (Fig. 26). When this occurs spring 77 will restore plunger 78 61, thus reversing the direction of rotation of eccentrics 56 and 57 on shaft 58. This in turn permits rings 44 and 45 to be shifted back toward their former positions, thus reducing the pump displacement.

Considering now the particular valve arrangement for controlling the delivery of liquid to the cylinders and the discharge of liquid therefrom, the stationary shaft 111 (Figs. 4 and 20), has a particularly novel type of porting arrangement in view of the fact that while one of the banks of cylinders is discharging, the other bank is filling, and the adjacent ports in the same plane must therefore be performing opposite functions. The shaft 111 is provided with the milled passageways 112 and 113 (Figs. 5 and 6), the passageway 112 communicating with the outlet port 71. The shaft 111 is provided with transversely extending slotted portions 116, 117, 118 and 119 which are disposed in alignment with the respective banks of cylinders and with the respective ports 121 and 122 in the bearing sleeve 123.

The passageways 112 and 113 comprise grooves milled in the shaft 111 and extend longitudinally to communicate with the ports 116 to 119, inclusive, in such manner as to take the combined discharge or suction of both banks of cylinders 41. The passageways 112 and 113 are closed for the major portion of their length (see Figs. 4 and 6), but have formed therein the delivery and suction openings 126 and 127, which openings serve both banks and connect said banks with the inlet and outlet chambers 70 and 71, respectively (see Figs. 20 and 21), leading to the inlet and outlet pipe fittings 70' and 71', respectively. The transverse views shown in Figs. 7, 8 and 9 indicate the manner in which the passages 112 and 113 cooperates with ports 116 to 119, inclusive, so that one of the banks of cylinders is discharging while the other bank is filling, and adjacent ports in the same plane (as 117 and 119) must therefore be providing opposite functions. The ports 116 to 119 feed the radial cylinders by way of multiple orifices 121, 122 in sleeve 123 (Figs. 16 and 20).

An important advantage flowing from the present invention is that said invention makes it possible to shift each stroke-controlling slide-block 48 and 49 by positive means operating by physical contact to shift each slide-block in two directions, in contra-distinction to dependence upon springs, or the like, bearing yieldably upon each slide-block and serving as the sole means for shifting such slide-blocks in one direction; springs of this character being unsatisfactory for several obvious reasons, one of which is the inability of springs to act uniformly throughout the pressure range of the pump, and another being the increased over-all dimensions resulting from use of relatively long springs disposed parallel to the line of shift of the reaction slide-block, or slide-blocks. While I employ a spring (the spring 77, Fig. 21) to effect rotation of the control shaft 58 in one direction, this spring does not act directly upon the reaction slide-blocks 48 and 49 (or their yokes 59 and 60), and therefore it is possible to locate it in a position which is tangential to the contour of the pump housing, hence it does not substantially increase the overall dimensions. Moreover, a single spring 77 serves as actuating means for the shifting of both reaction slide-blocks, 48 and 49.

Each unit—that is, the pump unit 33 and the motor unit 34—is shown (see Figs. 1 and 20) as including a cam-operated plunger pump for the purpose of withdrawing excessive liquid from the housings of both units and returning such excess to the suction line of the pump unit. Since both plunger pump assemblies are of the same construction and mode of operation, only the one shown in Fig. 1 need be described in detail. Referring to Fig. 1, the hollow shaft 122' of the motor has a key-way receiving a key 123, and said key fits into a key-way 124 (Fig. 12) cut in cam-ring or eccentric collar 125. This eccentric collar is adapted to be engaged by the spring pressed plunger 127 carried in an extending boss portion 128 on the housing member 129. The plunger 127 is adapted to reciprocate within the cylinder 131 upon rotation of the shaft 122', and is pressed into contact with the eccentric surface of the collar by means of the coil spring 132. Cylinder 131 has an annular groove 136' and connecting radial ports 131'. A spring 133 is seated in a recess in a threaded closure plug 134 closing the lower end of the cylinder. The plunger 127 is adapted to act as a pump producing a suction in the transverse passageway 133 leading to the annular groove 136'. This suction is produced by the upward movement of the plunger 127, and draws liquid into the space thus vacated by the plunger. Subsequent descent of plunger 127 expels such liquid by forcing it past the valve 137 and into the passageway 139. In other words, downward movement of the piston 127 causes pressure to be exerted upon such liquid, and this pressure causes the valve 137 to open against the pressure of spring 133, allowing this liquid to pass through the valve opening and into the outlet passage 139.

Thus as the piston 127 moves upwardly in the cylinder 131, liquid is withdrawn from the housing sump through the passageway 136, and upon opposite movement of the piston, is discharged under pressure through the valve 137 to the passageway 139.

As heretofore noted, the porting arrangement for the motor is the same as that for the pump. Therefore the stationary pintle shaft 111' of the motor (see Fig. 1) may be assumed to be identical to the stationary pintle shaft 111, as shown in Figs. 4 to 9, inclusive, as well as in Fig. 20. Likewise, the inlet and outlet ports 170 and 171 of the motor may be assumed to be the same in structure and mode of cooperation with the piston ports 181 and 182 of the motor, as the ports 70 and 71 of the pump; the alternate delivery of fluid to and discharge of fluid from the pockets of the pistons 53 of the motor being effective to cause reciprocation of said pistons by reason of their constant engagement with the eccentrically disposed bearing assemblies 51 and 52, and such reaction in turn causing a rotation of the piston enclosing cylinder block 55 and hence a rotation of the motor shaft 122' which has mechanical connection with the cylinder block 55, as shown more clearly in Figs. 14 and 15. Referring to these figures the mechanical connection is shown as taking the form of a plurality of radially extending spokes or tongues 191, formed on the shaft 122 and adapted to engage correspondingly spaced axially extending tongues or lugs 192 (see Fig. 1) formed centrally on the left-hand side of the cylinder block 55. A similar form of mechanical connection is employed to couple the pump shaft 105 with the cylinder block 106 of the pump (see Figs. 17 and 18). The pump is also provided with a flexible coupling in order to cushion the torque impulses applied to the outer drive member 32, before they reach the main shaft 105. As shown in Figs. 20 and 29 to 31, inclusive, this flexible coupling is of a type manufactured by the Falk Corporation of Milwaukee, Wisconsin and consisting essentially of a driving member 196, a driven member 197, and an intermediate connecting member in the form of a circular grid 198 of resilient material, the grid 198 being interwoven in angularly spaced notches formed about the peripheries of the members 196 and 197; the member 196 being keyed or splined to the driving member 32 and the member 197 being keyed to the pump shaft 105, as indicated at 199 (Fig. 20).

What is claimed is:

1. A fluid pump or the like having two axially spaced banks of pistons, a common cylinder block housing all of said pistons, means for rotating said cylinder block, said pistons reciprocating as the block rotates, a slidable structure in the plane of each bank of pistons surrounding said pistons, said structures being movable in opposite directions so that the inner surfaces of said structures acquire opposite eccentricities with respect to the axis of rotation of said cylinder blocks.

2. A fluid pump or the like having spaced banks of pistons, a cylinder block housing said pistons, means for rotating said block, means causing said pistons to reciprocate as the block rotates, a plurality of structures surrounding said block and movable in opposite directions to change the eccentricity of said pistons with respect to said second mentioned means.

3. A hydraulic mechanism adapted to control a supercharger for supplying air to a cabin comprising, a plurality of spaced banks of pistons, a cylinder block housing said pistons, means for rotating said block, means causing said pistons to reciprocate as the block rotates, a plurality of structures surrounding said block and movable in opposite directions to change the eccentricity of said pistons with respect to said second-mentioned means, and means responsive to changes of pressure in the cabin for effecting movement of said plurality of structures.

DESIRE J. DESCHAMPS.

REFERENCES CITED

The following references are of record in the file of this patent:

UNITED STATES PATENTS

| Number | Name | Date |
|---|---|---|
| 720,952 | Nielson | Feb. 17, 1903 |
| 1,152,729 | Hele-Shaw | Sept. 7, 1915 |
| 1,237,679 | Naeder | Aug. 21, 1917 |
| 1,437,885 | Beatty | Dec. 5, 1922 |
| 1,612,888 | Schneggenberger | Jan. 4, 1927 |
| 1,778,238 | Wilsey | Oct. 14, 1930 |
| 1,924,017 | Bedford | Aug. 22, 1933 |
| 1,924,124 | Kuzelewski | Aug. 29, 1933 |
| 1,965,937 | Ferris | July 10, 1934 |
| 1,998,004 | Ernst | Apr. 16, 1935 |
| 2,101,829 | Benedek | Dec. 7, 1937 |
| 2,115,121 | Phillips | Apr. 26, 1938 |
| 2,163,079 | Benedek | June 20, 1939 |
| 2,284,984 | Nixon et al. | June 2, 1942 |
| 2,297,495 | Pfau | Sept. 29, 1942 |
| 2,336,996 | McDonough | Dec. 14, 1943 |

FOREIGN PATENTS

| Number | Country | Date |
|---|---|---|
| 69,681 | Great Britain | July 6, 1922 |
| 481,093 | Great Britain | Mar. 7, 1938 |